United States Patent
Denel et al.

[15] 3,686,458
[45] Aug. 22, 1972

[54] SUPER CONDUCTIVE ELEMENT SWITCH

[72] Inventors: Jean Denel, 60 rue Remy Dumoncel, Paris 14e; Jean-Pierre Krebs, 22 rue de Chateaubriand, 92-Chatenay-Malabry; Enrique Santa-Maria, La Seigneurie, Bt.B., 91-Villiers-sur-Orge, all of France

[22] Filed: Aug. 25, 1971

[21] Appl. No.: 174,826

[30] Foreign Application Priority Data

Aug. 28, 1970 France..................7031535

[52] U.S. Cl. ..........................200/166 C, 335/216
[51] Int. Cl. ..................................H01h 1/02
[58] Field of Search...............200/166 C; 335/216; 174/DIG. 6, 126; 336/DIG. 1

[56] References Cited

UNITED STATES PATENTS

| | | |
|---|---|---|
| 3,349,209 | 10/1967 | Zar..................335/216 X |
| 3,360,692 | 12/1967 | Kafka.................335/216 X |
| 3,363,207 | 1/1968 | Brechna.................335/216 |

*Primary Examiner*—George Harris
*Attorney*—Richard C. Sughrue et al.

[57] ABSTRACT

A superconductive element switch having a first winding which assumes an annular form capable of passing from a superconductive state to a conductor state by application of a pulse of an intense magnetic field. This pulse is applied through a second control winding. Electrical power can be stored to a high degree within the superconductive element and then restored in an extremely fast responsive time, by changing the state of the first winding from a superconductive to a conductor state.

6 Claims, 4 Drawing Figures

PATENTED AUG 22 1972 3,686,458

INVENTORS
JEAN DENEL
JEAN-PIERRE KREBS
ENRIQUE SANTA-MARIA
BY Sughrue, Rothwell, Mion, Zinn & Macpeak
ATTORNEYS

SUPER CONDUCTIVE ELEMENT SWITCH

BACKGROUND OF THE INVENTION

1. Field of the Invention

The present invention relates to a superconductor element switch capable of storing electrical power and releasing it in a relatively short time.

2 Description of the Prior Art

Todays demands for electrical power have made it necessary to provide better methods of storing the electrical power and of releasing it at the exact required instant with a very short response time in the load circuit. Storing power in capacitors has been well known, but this solution carries with it a few disadvantages, and in particular, the fairly low value of power stored as well as the fairly great time constant which comes into play when that power is restored into a load network. The relatively high expense of utilizing capacitors and maintaining them has made this method of storing power relatively prohibitive.

It has been found preferable to store electrical power in a super conductive winding and to restore it subsequently to the load network through a superconductive element switch. Superconductive element switches are generally constituted by elements suitable for being made either conductive, be exceeding critical parameters of a magnetic field or of the temperature, or superconductive, by the return of the temperature to a value lower than the critical temperature of the material. A number of these superconductive elements switches use combined control means, namely, temperature and magnetic field. Generally, a cooling fluid is used, such as liquid helium, to completely immerge the superconductive element and to set its temperature. Among the known superconductive element switches is a rectilinear superconductive wire surrounded by a control winding, the superconductive wire being controlled by a temperature variation or a magnetic field variation, in order to make it switch over from the superconductive state to the conductive state.

Another known form of superconductive element switch utilizes a thin superconductive layer, the magnetic field control being exerted in a normal direction or a direction parallel to the surface of the thin layer.

A further known superconductive element switch comprises a superconductive cable wound in a annular configuration, the switching control being effected by means of a control winding, the turns of that control winding having for their surface, that of the cross-section of the superconductive ring in an axial half-plane. Control is effected as in the other types of switches, by changing the temperature or magnetic field. The annular type of superconductive element switch is the most efficient, but technological difficulties remain, particularly concerning the electrical insulation of the superconductive wires in the winding and the problems of inductance that pertain to the superconductive winding as well as the magnetic field, due to this winding. Usually, at the instant of restoring the stored power from the superconductive element, the voltage generated will be extremely high at the terminals of the switch. The inherent inductance of the superconductive cable ring must therefore be very low in relation to the inductance of the superconductive winding in which the power has been stored.

SUMMARY OF THE INVENTION

The present invention provides a superconductive element switch having a configuration of a circular ring and comprising a first winding of layers of turns of a superconductive cable that have for their axis, the same axis as the ring. The particular winding and arrangement of the present invention provides a low inductance, while avoiding any difficulties of a high voltage at the terminals. One end of the cable of the first winding of the superconductive element switch constitutes one terminal of the switch, while the other end of the cable constitutes the other terminal of the switch. A second winding of control turns is wound within a radial plane of the ring, so as to envelop the first winding and has for its surface, that of the cross-section of the ring by an axial half-plane. The layers of turns of the first winding are separated by a first insulator, while the turns of the first winding and the insulator of the first winding are covered by a material acting as a support for the superconductive winding and for the first insulator. The first insulator and the turns of the superconductive cable being surrounded by a layer of insulation of a second type.

BRIEF DESCRIPTION OF THE DRAWINGS

By way of illustration, an example of the switch of the superconductive conductor element switch of the present invention will be described with respect to the following diagrammatic Figures, in which.

DESCRIPTION OF THE PREFERRED EMBODIMENT

In describing the elements of each of the Figures, the same elements in one Figure will bear the same references as the other Figures.

Figure 1:
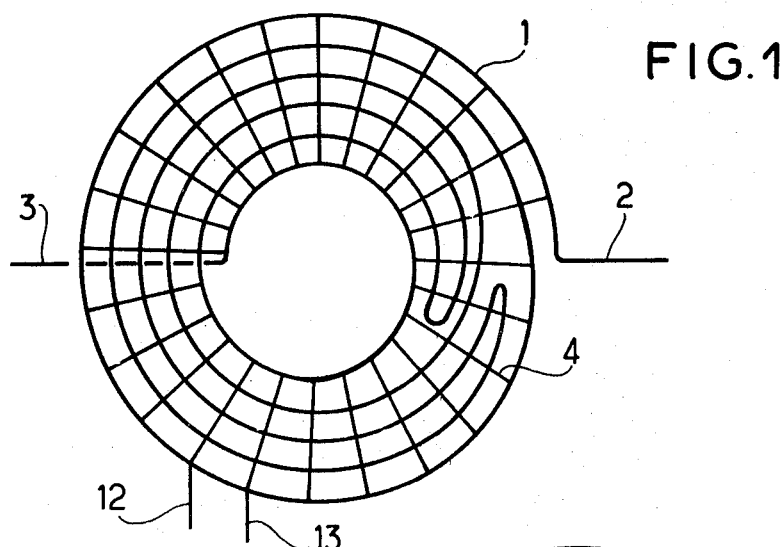
FIG. 1 is a top view of the superconductive element switch.

Referring to FIG. 1, the superconductor element switch is disclosed in a top view, in which a first winding of the layers of turns of a superconductive cable 1 is arranged in a staged configuration so as to constitute a ring.

The two ends 2 and 3 of the first winding constitute the two terminals of the superconductive element switch. These two ends 2 and 3 are diametrically opposite so as to avoid any danger of producing an electric arc. A second winding 4 comprising turns of a conductive material is utilized as a control winding whose turns are coiled within a radial plane of the ring so as to envelop the first winding. The terminals, or ends, 12 and 13 of the second winding are utilized in effectuating the control of the superconductive element switch.

Figure 2:
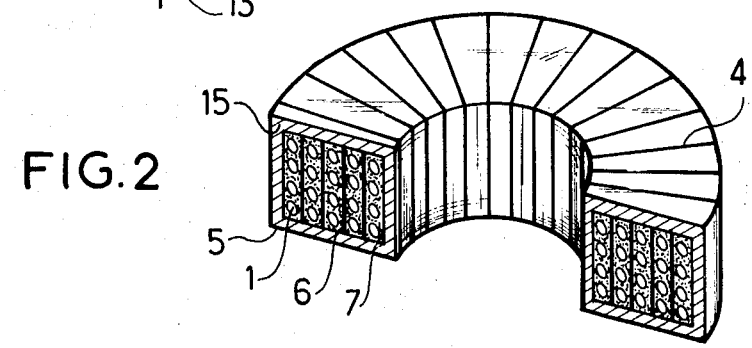
FIG. 2 is a perspective and sectional view through an axial plane of the switch.

Referring to the perspective sectional view illustrated in FIG. 2, the layers of turns 1 of the first winding of the superconductive cable, as well as the second control winding 4 is disclosed. The layers of the superconductive cable are separated by an insulator 6, while the superconductive cable as well as the insulator is separated by a second insulator material 7, which also acts as a support for the superconductive cable winding and for the insulator of the first type. The insulating support material 7 helps avoid any relative sliding of the strands 10 of the superconductive cable 1, as disclosed in FIG. 4. An insulating tape 15 is wound around the superconductive winding and is distinguishable from the insulation 6 and from the insulating support material 7. This insulating tape is obtained by polymerization at a high temperature and pressure and can, for example, be "TEFLON" manufactured by the E. I. Dupont Company. The insulating tape 15 insulates the superconductive winding of the control winding.

Figure 3:
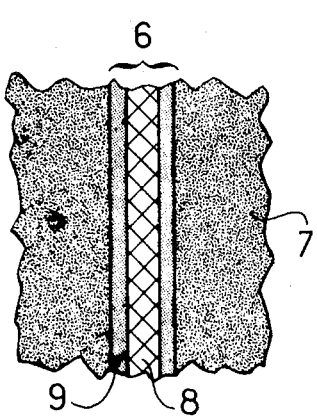
FIG. 3 is a sectional view of the insulators.

Referring to FIG. 3, the insulation 6 comprises a dielectric layer 8 which can be, for example, "MYLAR", and is covered on both its faces with a glass fabric 9. The supporting insulation material 7 can be a resin, for example of the "epoxy resin" type.

Figure 4:
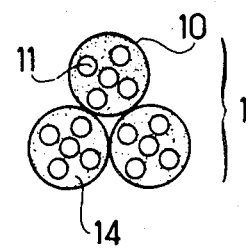
FIG. 4 is a diagrammatic sectional view perpendicular to the axis of the superconductive cable.

Referring to FIG. 4, the superconductive cable 1 is composed of several strands of which only three are shown at 10. Each strand comprises superconductive filaments 11, surrounded by an insulating material 14, which serves both as a support and has a great electrical resistivity.

By way of an example, the superconductive filament can be an alloy of niobium and titanium, with filaments of each strand being covered by a matrix made of an alloy of copper and nickel. A successful cable has been made comprising twenty-seven strands, with each strand made up of 61 filaments. This cable is known as the "LITZ CABLE". Experiments have enabled a power of 50 kilo-joules having approximately a current of 1,000 amperes to be released into a load circuit in about 1 millisecond, with the initial voltage being 100 kilovolts.

The control device for initiating the changeover from the superconductive state to the conductive state can be of the magnetic type, utilizing a pulse from a magnetic field having sufficient amplitude and duration, and applied to the ends 12 and 13 of the control winding. This, in effect, produces an open state to the switch. The return to the superconductive state can be effected by the return of the superconductive cable at a temperature lower than the critical changeover temperature thereby placing the switch into the closed state. The cooling fluid used for example, can be liquid helium.

Referring to FIG. 1, the layers of the superconductive winding are so arranged that the winding direction is alternated at intervals, for example, every other layer. The purpose of this arrangement is to cancel any inductance inherent to that winding as well as the magnetic interference field which it may generate.

Referring to FIG. 2, the insulator 7 protrudes past the edges of each layer of superconductive cable, thereby removing all danger of developing an electric arc between the end turns of each layer due to any disruptive discharge in the insulator.

Since the above-described embodiment is illustrative only of the inventive concept, it should be clear that a person skilled in the art could make modifications within the scope of the present invention and accordingly, the invention should be determined solely from the following claims:

WHAT IS CLAIMED IS:

1. A superconductive element switch having a ring like configuration for storing electrical energy and releasing it in a relatively short time span comprising a first winding of superconductive cable, the cable being wound into layers of turns with the layers extending in the radial direction, one end of the superconductive cable being one terminal of the switch, while the other end is the other terminal;

a second winding of control cable having turns of cable would within a radial plane of the ring so as to envelop the first winding and having for its surface that of the cross-section of the ring by an axial half-plane;

a first insulation material separating the turns of the first winding;

a second insulating material convering and supporting the first winding and first insulation material, and a third insulating housing enveloping the first winding and first and second insulating material, whereby the second winding can control the release of electrical energy.

2. A superconductive element switch as in claim 1, where the first insulating material is a dielectric layer covered on both its faces with a glass fabric.

3. A superconductive element switch as in claim 2, where the second insulating material is a plastic resin.

4. A superconductive element switch as in claim 3, where the direction of the turns of cables of the first winding alternate in a cross-sectional plane.

5. A superconductive element switch as in claim 3, where the third insulating housing is teflon.

6. A superconductive element switch as in claim 4, where the superconductive cable o the first winding comprises strands of superconductive filaments.

* * * * *